3,365,427
ARYL PHOSPHONATE MODIFIED
POLYCARBONAMIDES
James B. Ballentine, Chapel Hill, and Lawrence W. Crovatt, Jr., Raleigh, N.C., assignors to Monsanto Company, St. Louis, Mo., a corporation of Delaware
No Drawing. Filed Sept. 8, 1964, Ser. No. 395,078
10 Claims. (Cl. 260—78)

ABSTRACT OF THE DISCLOSURE

Nylon is rendered resistant to acid dyes by incorporating into the polymer alkali metal salts of monofunctional aryl phosphonates.

---

Although textile fibers obtained from fiber-forming polycarbonamides heretofore known are of great value, they are deficient in dying properties inasmuch as they all possess the same acid dyeable characteristic and each type will dye to a single shade only. This is a distinct disadvantage since it eliminates the possibility of obtaining other dyeable color effects where some of the fibers do not absorb dye or absorb less dye. It is desirable therefore to produce polycarbonamides which have acid dye-resist characteristics so that by combining such polycarbonamides with standard polycarbonamides in varying amounts it would be possible to produce polycarbonamide articles which are dyeable to different tones of the same color.

It is an object of the present invention to provide novel and useful fiber-forming synthetic linear polycarbonamides.

Another object is to provide shaped articles such as textile fibers, produced from such polycarbonamides, the said articles having superior acid dye-resist properties. A further object is to provide a process for the production of polycarbonamides from which shaped articles having superior acid dye-resist properties can be prepared.

These and other objects will become apparent in the course of the following specification and claims.

The polycarbonamides of the present invention are useful in the production of shaped articles by extrusion, molding, or casting in the nature of yarns, fabrics, films, pellicles, bearings, ornaments, or the like. They are particularly useful in the production of textile fibers.

The present invention provides a novel polycarbonamide wherein recurring polycarbonamide linkages are an integral part of the polymer chain and containing as a component part of the polymer chain between about 0.1 and 2.0 weight percentage and preferably between about 0.5 and about 1.0 weight percentage, based on the weight of the polycarbonamide, of units represented by the formula:

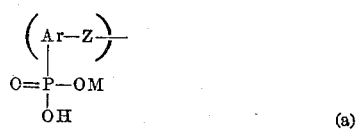

(a)

wherein Ar is a carbocylic aromatic nucleus containing 6 to 12 carbon atoms, Z is a member of the class consisting of

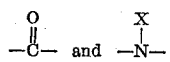

X is a member of the class consisting of hydrogen and lower alkyl radicals and M is an alkali metal.

In a typical preparation the polycarbonamide is formed by interpolymerizing a polycarbonamide composition selected from the group consisting of (A) substantially equal molecular proportions of at least one dibasic carboxylic acid represented by the formula:

HOOC—R—COOH    (b)

wherein R is a divalent hydrocarbon radical, and at least one diamine represented by the formula

wherein X and R are as defined above, (B) a monoaminomonocarboxylic acid represented by the formula:

wherein X and R are as defined above, and (C) mixtures of (A) and (B), in the presence of an aryl alkali metal phosphonate represented by the formula:

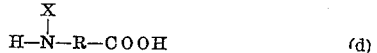

wherein Ar, Z and M are as defined above, Y is —H, —OH, —Cl or R', R' being a lower alkyl such that R'—OH is volatile below the decomposition temperature of the polycarbonamide formed.

The nature of the radical —R— in the acid, the diamine, or the amino acid is not critical. Preferably, it is a divalent hydrocarbon radical containing no more than about 20 carbon atoms. Acids of the class illustrated by the formula designated (b) are oxalic, adipic, suberic, pimelic, azelaic, sebacic brassylic, octadecandeioic, undecanedioic, glutaric, tetradecanedioic, p-phenylenediactic, isophthalic, terephthalic, hexahydroterephthalic and the like, and mixtures thereof.

Typical suitable diamines of the class illustrated by the formula designated (c) above are ethylene diamine, propylene diamine, tetramethylenediamine, pentamethylenediamine, hexamethylenediamine, octamethylenediamine, decamethylenediamine, p-xylylenediamine, p-phenylenediamine, hexahydro-p-phenylenediamine, bis(4-aminocyclohexy)methane, piperazine, dimethylpiperazine, tetramethylpiperazine, the N,N'-dimethyl, N,N'-diethyl and N,N'-diisopropyl derivatives of the above, and the like, as well as mixtures thereof.

Typical suitable amino acids of the class illustrated by the formula (d) above are 6-aminocaproic acid, 9-aminononanoic acid, 11-aminoundecanoic acid, and 17-aminoheptadecanoic acid, and the like.

In place of the above noted dibasic dicarboxylic acids, diamines, and amino acids, the amide forming derivatives thereof can be employed to form fiber-forming polymers. Amide forming derivatives of the dibasic dicarboxylic acids comprise the mono- and di-ester anhydride, the mono- and di-amide in the acid halide. Amide forming derivatives of the diamines include the carbamate and N-formyl derivatives. Amide forming derivatives of the amino acids include the ester, the anhydride, amide, lactam, acid halide, N-formyl derivative, carbamate, and in the presence of water, the nitrile.

As indicated above, the compounds found useful in the practice of this invention are characterized by an alkali metal phosphonate group and at least one amide-forming group attached to aryl nucleus and are represented by the formula:

wherein Ar, Z, M, and Y are as defined above. Illustrative of such compounds are potassium-carboxybenzenephosphonate, sodium-carboxybenzenephosphonate, potassium-aminobenzenephosphonate, potassium-carboxynaphthalene phosphonate, sodium - aminonaphthalene phosphonate, and the like. The preferred additive compound is potassium-carboxybenzene phosphonate.

The polycarbonamides of the invention are prepared by procedures well known in the art, and commonly employed in the manufacture of simple polyamides. That is, the reactants are heated at a temperature of from 180° C. to 300° C. and preferably from 200° C. to 295° C. until the product has a sufficiently high molecular weight to exhibit fiber-forming properties, which properties are reached when the polyamide has an intrinsic viscosity of at least 0.4. The reaction can be conducted at superatmospheric, atmospheric, or sub-atmospheric pressure. Ofter it is desirable, especially in the last stage of the reaction, to employ conditions, e.g., reduced pressure, which will aid in the removal of the reaction by products. Preferably, the reaction is carried out in the absence of oxygen, for example, in an atmosphere of nitrogen.

Intrinsic viscosity is employed herein as defined as $$\lim_{C \to 0}\left(\frac{\log_e N_r}{C}\right)$$

in which $N_r$ is the relative viscosity of a dilute solution of the polymer in m-cresol in the same units and at the same temperature, and C is the concentration in grams of polymer per 100 cc. of solution.

The amount of additive which may be present as a component part of the polymer chain of the polycarbonamides of this invention may vary depending upon the type of polymer desired and the particular shaped article in which it is to find its end use. It has been found necessary to employ about 0.1 and 2.0 weight percentage based on the weight of the polycarbonamide. At least 0.1 weight percentage of additive is required in order that a significant level of acid dye-resist properties be obtained. It has been found that the best results are obtained when about 0.5 and about 1.0 weight percentage of additive based on the weight of the polycarbonamide are employed. Amounts greater than 2.0 weight percentage have an adverse effect of the viscosity of the polycarbonamide produced. It has been found that when the additives of the present invention are employed within amounts of 0.1 and 2.0 weight percentage based on the weight of the polycarbonamide, and especially from about 0.5 to 1.0 weight percentage, the polycarbonamide produced has been found to possess excellent acid dye-resist properties and to have a viscosity in the fiber-forming range.

In order to illustrate the invention and the advantages thereof with greater particularity, the following specific examples are given. It is to be understood that they are intended to be only illustrative and not limitative. Parts are given by weight unless otherwise indicated.

EXAMPLE I

A solution of 147 grams of hexamethylene diammonium adipate salt was dissolved in 153 grams of water and added to a stainless steel evaporator which had previously been purged with nitrogen. The solution was heated under a nitrogen blanket at a pressure of 13 p.s.i.g. with the continuous removal of steam until the condensate and salt solution reached the temperature of 137° C. At this point the salt solution was charged to a stainless steel high pressure autoclave which contained 0.81 gram (0.64 weight percent) of potassium-carboxybenzene phosphonate. The temperature and pressure were slowly raised to 243° C. and 250 p.s.i.g. during which time there was a continuous removal of steam. Thereafter the pressure was gradually reduced to atmospheric pressure over a 25 minute period and the polymer melt was allowed to equilibrate for 30 minutes at 278° C. The finish polymer was then melt spun through a 13 hole spinneret yielding white multifilament yarns. These yarns were drawn over hot pins at a draw ratio of 5.5 times the original length.

Dying of these yarns was carried out by emersing in an acid dye bath containing 3 percent, based on the weight of the yarn, of Scarlet 4 RA Conc. CF (C.I. Acid Red 18) and 1.2 percent formic acid. The weight ratio of dye bath fiber was maintained at 40:1 and dying was conducted for 2 hours at 100° C. and at a pH of 3.1. Spectrophotometric measurement showed these yarns absorbed 0.51 percent of the dye whereas dye absorption for unmodified polyhexamethylene adipamide yarns which were prepared and dyed in an identical manner as above was 1.06 percent.

EXAMPLE II

The procedure of Example I was repeated with the exception that 1.35 grams (1.06 weight percent) of potassium-carboxybenzenephosphonate was employed. Yarns so produced were found to absorb 0.06 percent by weight of the dye when dyed in an identical manner as described in Example I.

EXAMPLE III

Poly-epsilon-caproamide containing 0.5 weight percent of potassium-carboxybenzene phosphonate was prepared by melt blend in 100 grams of episilon-caprolactam with 0.5 gram of potassium-carboxybenzene phosphonate at 265° C. while under a nitrogen atmosphere. The product was melt spun at 255° C. through a 13 hole spinneret yielding white multi-filament yarns. The yarns were dyed in a manner described in Example I and were found to absorb 0.99 percent Scarlet 4 RA Conc. CF (C.I. Acid Red 18). Unmodified poly-epsilon-caprolactam prepared and dyed in an identical manner were found to absorb 1.35 percent of the dye.

EXAMPLE IV

Preparation of a copolyamide containing poly-epsilon-caproamide and polyhexamethylene sebacamide in a 50:50 molar ratio and containing 0.5 percent by weight of potassium-carboxybenzene phosphonate was carried out by charging 75 grams of hexamethylenediammonium sebacate dissolved in 220 grams of water to a stainless steel evaporator. The unit was purged with nitrogen and the solution temperature raised to 137° C. with the continuous removal of steam while under a pressure of 13 p.s.i.g. At this point the concentrated salt solution was piped under pressure into a high pressure autoclave containing 40.1 grams of epsilon-caprolactam and 0.5 gram of potassium-carboxybenzene phosphonate. The autoclave pressure was then increased to 250 p.s.i.g. and the temperature raised to 243° C. during which steam was continually removed. At this point the autoclave pressure was gradually reduced to atmospheric pressure and the copolymer melt temperature was allowed to level off at 260° C. The melt was then allowed to equilibrate for a period of 30 minutes after which it was melt spun at 215° C. through a 13 hole spinneret yielding white multi-filament yarns.

The dying procedures outlined above in Example I were repeated and these yarns were found to absorb 0.69 percent of Scarlet 4 RA Conc. CF (Acid Red 18). Dye absorption of an unmodified yarn containing poly-epsilon-caproamide and polyhexamethylene sebacamide in a 50:50 molar ratio was 1.86 percent.

EXAMPLE V

Preparation of a copolyamide of poly-epsilon-caproamide and poly-omegaundecanamide in a weight ratio of 90:10 respectively and containing 0.5 percent of potassium-carboxybenzene phosphonate was carried out by charging 90 grams of epsilon-caprolactam, 11 parts of 11-aminoundecanoic acid, 0.5 gram of potassium-carboxybenzene phosphonate, and 33 grams of water to a stainless steel autoclave under a nitrogen atmosphere. The autoclave was pressurized to 250 p.s.i.g. and heated to 243° C. during which there was a continuous removal of steam. At this point the pressure was gradually reduced over a 25 minute period to atmospheric pressure and the temperature of polymer melt was allowed to level out at 245° C. The polymer melt was then allowed to equilibrate at this temperature for 30 minutes after which it was melt spun through a 13 hole spinneret yielding white multi-filament yarns.

The dying procedure and conditions outlined in Example I were repeated and these yarns were found to absorb 1.21 percent of Scarlet 4 RA Conc. CF (Acid Red 18). Dye absorption of an unmodified copolyamide containing poly-epsilon-caproamide and poly-omega-undeconamide in a 90:10 ratio was found to be 2.7 percent.

EXAMPLE VI

Preparation of a copolyamide containing polyhexamethylene adipamide and polyhexamethylene sebacamide in 90:10 molar ratio and containing 0.5 weight percent of potassium-carboxybenzene phosphonate was carried out by charging a stainless steel autoclave with 90 grams of hexamethylene diammonium adipate, 10 grams of hexamethylene diammonium sebacate, and 0.5 gram of potassium-carboxybenzene phosphonate. These ingredients were then melted under a purified nitrogen atmosphere at 280° C. and the polymer melt allowed to remain at this temperature for 1 hour after which it was melt spun through a 13 hole spinneret into white multi-filament yarns.

The dying procedures and conditions outline in Example I were repeated and these yarns were found to absorb 0.98 percent of Scarlet 4 RA Conc. CF (Acid Red 18). Unmodified yarns composed of polyhexamethylene adipamide and polyhexamethylene sebacamide in a 90:10 molar ratio prepared and died in an identical manner as above was found to be 1.29 percent.

As can be seen from the above results, fibers made from the polycarbonamides of the present invention all possess a resistance to acid type dyes. This enables manufacturers to produce fibers having the same basic polycarbonamide molecular structure as conventional polycarbonamides but different affinities for acid dyes. This in turn offers dying diversification for fabric color-on-white effects and tone-on-tone effects heretofore not readily obtainable.

We claim:

1. A fiber-forming synthetic linear polycarbonamide wherein recurring carbonamide linkages are an integral part of the polymer chain and containing as a component part of the polymer chain between about 0.1 and 2.0 weight percentage, based on the weight of the polycarbonamide of units represented by the formula

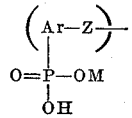

wherein Ar is a carbocyclic aromatic nucleus containing 6 to 12 carbon atoms, Z is a member of the class consisting of

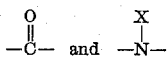

X is a member of the class consisting of hydrogen and lower alkyl radicals and M is an alkali metal.

2. The fiber-forming synthetic linear polycarbonamide as set forth in claim 1 wherein the polycarbonamide is poly-hexamethylene adipamide.

3. The fiber-forming synthetic linear polycarbonamide as set forth in claim 1 wherein the polycarbonamide is poly-epsilon-caproamide.

4. The fiber-forming synthetic linear polycarbonamide as set forth in claim 1 wherein the polycarbonamide is a copolymer of poly(hexamethylene sebacamide/epsilon caproamide).

5. The fiber-forming synthetic linear polycarbonamide as set forth in claim 1 wherein the polycarbonamide is a copolymer of poly(epsilon caproamide/omega-undeconamide).

6. The fibre-forming synthetic linear polycarbonamide as set forth in claim 1 wherein the polycarbonamide is a copolymer of poly(hexamethylene adipamide/hexamethylene sebacamide.

7. A fiber-forming synthetic linear polycarbonamide wherein recurring polycarbonamide linkages are an integral part of the polymer chain and containing as a component part of the polymer chain between about 0.1 and 2.0 weight percentage based on the weight of the polycarbonamide of units represented by the formula

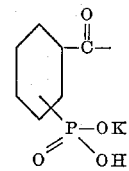

8. Poly-hexamethylene adipamide containing as a component part of the polymer chain between about 0.1 and 2.0 weight percentage based on the weight of the polyhexamethylene adipamide of units represented by the formula

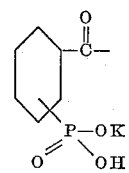

9. Poly-epsilon-caproamide containing as a component part of the polymer chain between about 0.1 and 2.0 weight percentage, based on the weight of the polyepsilon-caproamide of units represented by the formula

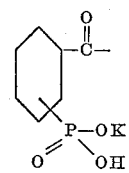

10. A textile fiber of the polycarbonamide as defined in claim 1.

References Cited

UNITED STATES PATENTS

| | | | |
|---|---|---|---|
| 2,646,420 | 7/1953 | Morgan | 260—78 |
| 2,981,715 | 4/1961 | Ben | 260—78 |
| 3,235,534 | 2/1966 | Brinkman et al. | 260—78 |

WILLIAM H. SHORT, *Primary Examiner.*

H. D. ANDERSON, *Assistant Examiner.*